(12) United States Patent
Seo et al.

(10) Patent No.: US 7,729,594 B2
(45) Date of Patent: Jun. 1, 2010

(54) RECORDING MEDIUM AND METHOD AND APPARATUS FOR REPRODUCING TEXT SUBTITLE STREAM INCLUDING PRESENTATION SEGMENTS ENCAPSULATED INTO PES PACKET

(75) Inventors: Kang Soo Seo, Anyang-si (KR); Sung Wan Park, Suwon-si (KR); Byung Jin Kim, Seongnam-si (KR); Jea Yong Yoo, Seoul (KR); Seung Hoon Lee, Seongnam-si (KR)

(73) Assignee: LG Electronics, Inc., Seoul (KR)

( * ) Notice: Subject to any disclaimer, the term of this patent is extended or adjusted under 35 U.S.C. 154(b) by 1000 days.

(21) Appl. No.: 11/070,238

(22) Filed: Mar. 3, 2005

(65) Prior Publication Data
US 2005/0207738 A1     Sep. 22, 2005

(30) Foreign Application Priority Data
Mar. 18, 2004    (KR) ..................... 10-2004-0018461

(51) Int. Cl.
*H04N 5/85* (2006.01)
(52) U.S. Cl. .................. 386/95; 386/126; 386/E5.025
(58) Field of Classification Search ................... 386/95, 386/125, 126, E5.025
See application file for complete search history.

(56) References Cited

U.S. PATENT DOCUMENTS

| | | | | |
|---|---|---|---|---|
| 4,040,088 | A | * | 8/1977 | Hannan ....................... 386/100 |
| 5,519,443 | A | * | 5/1996 | Salomon et al. ............. 348/467 |
| 5,949,752 | A | | 9/1999 | Glynn et al. |
| 5,999,255 | A | | 12/1999 | Dupée et al. |
| 6,115,077 | A | | 9/2000 | Tsukagoshi |
| 6,204,883 | B1 | | 3/2001 | Tsukagoshi |
| 6,219,043 | B1 | | 4/2001 | Yogeshwar et al. |
| 6,253,221 | B1 | * | 6/2001 | Kim ........................... 715/264 |
| 6,275,457 | B1 | | 8/2001 | Maeda |

(Continued)

FOREIGN PATENT DOCUMENTS

CN     1385857     12/2002

(Continued)

OTHER PUBLICATIONS

International Search Report dated Aug. 8, 2005.

(Continued)

*Primary Examiner*—David E Harvey
(74) *Attorney, Agent, or Firm*—Harness, Dickey & Pierce, P.L.C.

(57) ABSTRACT

A buffer initially preloads a text subtitle stream recorded on a recording medium. The preloaded text subtitle stream includes a dialog style segment defining a group of region styles and a plurality of dialog presentation segments, each of which contains at least one region of dialog text. Each region of dialog text is linked to a selected one of the group of region styles defined in the dialog style segment. The dialog style segment and the plurality of dialog presentation segments are encapsulated in a plurality of PES packets, respectively. A text subtitle decoder decodes and presents each dialog presentation segment according to a continuous presentation flag included in each dialog presentation segment. The continuous presentation flag indicates whether continuous presentation is required for each dialog presentation segment with previous one.

48 Claims, 19 Drawing Sheets

```
dialog_presentation_segment () {
        segment_type
        reserved
        segment_length
        dialog_start_PTS
        dialog_end_PTS
        palette_update_flag
        reserved
        if (palette_update_flag==1b) {
                palette()
        }
        number_of_regions
        for (region_id=0; region_id<number_of_regions; region_id++)
        {
                dialog_region() {
                        continuous_present_flag[region_id]
                        region_style_id[region_id]
                        region_subtitle()
                }
        }
}
```

U.S. PATENT DOCUMENTS

| | | | |
|---|---|---|---|
| 6,288,900 B1 | 9/2001 | Johnson et al. | |
| 6,288,990 B1 | 9/2001 | Fujiie et al. | |
| 6,381,513 B1 | 4/2002 | Takase et al. | |
| 6,452,609 B1 | 9/2002 | Katinsky et al. | |
| 6,477,185 B1 | 11/2002 | Komi et al. | |
| 6,763,178 B1 | 7/2004 | Suzuki et al. | |
| 7,197,234 B1 | 3/2007 | Chatterton | |
| 7,324,119 B1 | 1/2008 | Puri et al. | |
| 2001/0030710 A1 | 10/2001 | Werner | |
| 2002/0006271 A1 | 1/2002 | Winter et al. | |
| 2002/0106193 A1 | 8/2002 | Park et al. | |
| 2002/0194618 A1 | 12/2002 | Okada et al. | |
| 2003/0021586 A1* | 1/2003 | Suh | 386/95 |
| 2003/0156504 A1 | 8/2003 | Kanegae et al. | |
| 2003/0202431 A1 | 10/2003 | Kim et al. | |
| 2003/0235406 A1 | 12/2003 | Seo et al. | |
| 2004/0001699 A1 | 1/2004 | Seo et al. | |
| 2004/0081434 A1 | 4/2004 | Jung et al. | |
| 2004/0101285 A1 | 5/2004 | Seo et al. | |
| 2005/0008339 A1 | 1/2005 | Kuroiwa et al. | |
| 2005/0147387 A1* | 7/2005 | Seo et al. | 386/95 |
| 2005/0201718 A1 | 9/2005 | Kato | |
| 2006/0153532 A1 | 7/2006 | McCrossan et al. | |
| 2006/0288302 A1 | 12/2006 | Yahata et al. | |
| 2007/0127885 A1* | 6/2007 | Seo et al. | 386/95 |
| 2008/0253734 A1 | 10/2008 | Kang et al. | |

FOREIGN PATENT DOCUMENTS

| | | | |
|---|---|---|---|
| CN | 1428770 | | 7/2003 |
| EP | 0737009 | | 10/1996 |
| EP | 0737979 | | 10/1996 |
| EP | 0791925 | | 8/1997 |
| EP | 0 942 609 A1 | | 9/1999 |
| EP | 1 198 132 A1 | | 4/2002 |
| EP | 1 204 280 A1 | | 5/2002 |
| EP | 1 280 347 A1 | | 1/2003 |
| EP | 1367587 | | 12/2003 |
| EP | 1 408 505 | | 4/2004 |
| EP | 1614108 | | 10/2004 |
| EP | 1 553 769 A1 | | 7/2005 |
| EP | 1 643 765 | | 4/2006 |
| GB | 1586431 | * | 5/1978 |
| GB | 1556366 | * | 11/1979 |
| JP | 60-179261 | * | 9/1985 |
| JP | 8-273304 | | 10/1996 |
| JP | 9-35458 | | 2/1997 |
| JP | 11-176137 | | 7/1999 |
| JP | 2001-135066 | | 5/2001 |
| JP | 2002-025197 | | 1/2002 |
| JP | 2002-101389 | | 4/2002 |
| JP | 2002-158971 A | | 5/2002 |
| JP | 2002-247526 A | | 8/2002 |
| JP | 2003-134440 | | 5/2003 |
| JP | 2003-249057 A | | 9/2003 |
| JP | 2003-283942 | | 10/2003 |
| RU | 2196389 | | 1/2003 |
| RU | 2229174 | | 5/2004 |
| WO | WO 99/22516 | | 5/1999 |
| WO | WO 02/075739 | | 9/2002 |
| WO | WO 03/056560 | | 7/2003 |
| WO | WO 2004/030356 A1 | | 4/2004 |
| WO | WO 2004/034398 | | 4/2004 |
| WO | WO 2004/036574 | | 4/2004 |
| WO | WO 2004/056105 | | 7/2004 |
| WO | WO 2004/066281 | | 8/2004 |
| WO | WO 2004/093064 | | 10/2004 |
| WO | WO 2004/098186 A1 | | 11/2004 |
| WO | WO 2005/074394 | | 8/2005 |
| WO | WO 2005/074399 A2 | | 8/2005 |

OTHER PUBLICATIONS

ETSI EN 300 743, V1.2.1: "Digital Video Broadcasting(DVB); Subtitling systems" (Jun. 2002).
Synchronized Multimedia Integration Language (SMIL) 1.0 Specification, Jun. 15, 1998, 38 pages.
Russian Office Action dated Aug. 20, 2008, with English language translation.
Translation of Russian Office Action dated Oct. 30, 2008.
"Blu-ray Disc—White Paper Blu-ray Disc Format: 2.B Audio Visual Application Format Specifications for BD-ROM", Blu-Ray Disc Association, Mar. 2005.
European Search Report dated Jan. 31, 2005.
Russian Office Action dated Feb. 18, 2009 with English language translation.
Translation of Japanese Office Action.
May 8, 2009 Japanese Office Action.
Chinese Office Action dated May 9, 2008.
Russian Notice of Allowance dated May 18, 2009 (with translation).
Russian Notice of Allowance dated May 28, 2009 (with translation).
ISO/IEC 13818-1, second edition, Dec. 1, 2002.
U.S. Office Action issued on Aug. 31, 2009 for counterpart U.S. Appl. No. 10/898,207.
U.S. Office Action issued on Sep. 3, 2009 for counterpart U.S. Appl. No. 10/960,485.
European Notice of Allowance issued on Jun. 3, 2009 for counterpart application No. EP 05721896.8.
Japanese Office Action dated Sep. 15, 2009 for corresponding Japanese Patent Application No. 2006-535261 with English Translation.
Search Report for European patent application No. 04774776 dated Dec. 28, 2009.
"W3C synchronized multimedia integration language (SMIL) 1.0 specification," Internet Citation, Jun. 15, 1998, XP002957990 [retrieved on Oct. 28, 2002].
Blu-Ray Disc Founders: "White paper Blu-Ray Disc Format: 2.B Audio Visual Application format specifications for BD-ROM," Internet Citation, Aug. 2004, XP002315435, retrieved from the Internet: URL:http://www.blu-raydisc.com/assets/downloadablefile/2b_bdrom_audiovisualapplication-12841.pdf>, [retrieved on Jan. 23, 2005].
Office Action for Chinese patent application No. 200480030092.2 dated Jan. 29, 2010 (in English).
Office Action for Japanese patent application No. 2006-535258 dated Mar. 12, 2010 (with English translation).
Office Action for U.S. Appl. No. 10/960,485 dated Feb. 22, 2010.

* cited by examiner

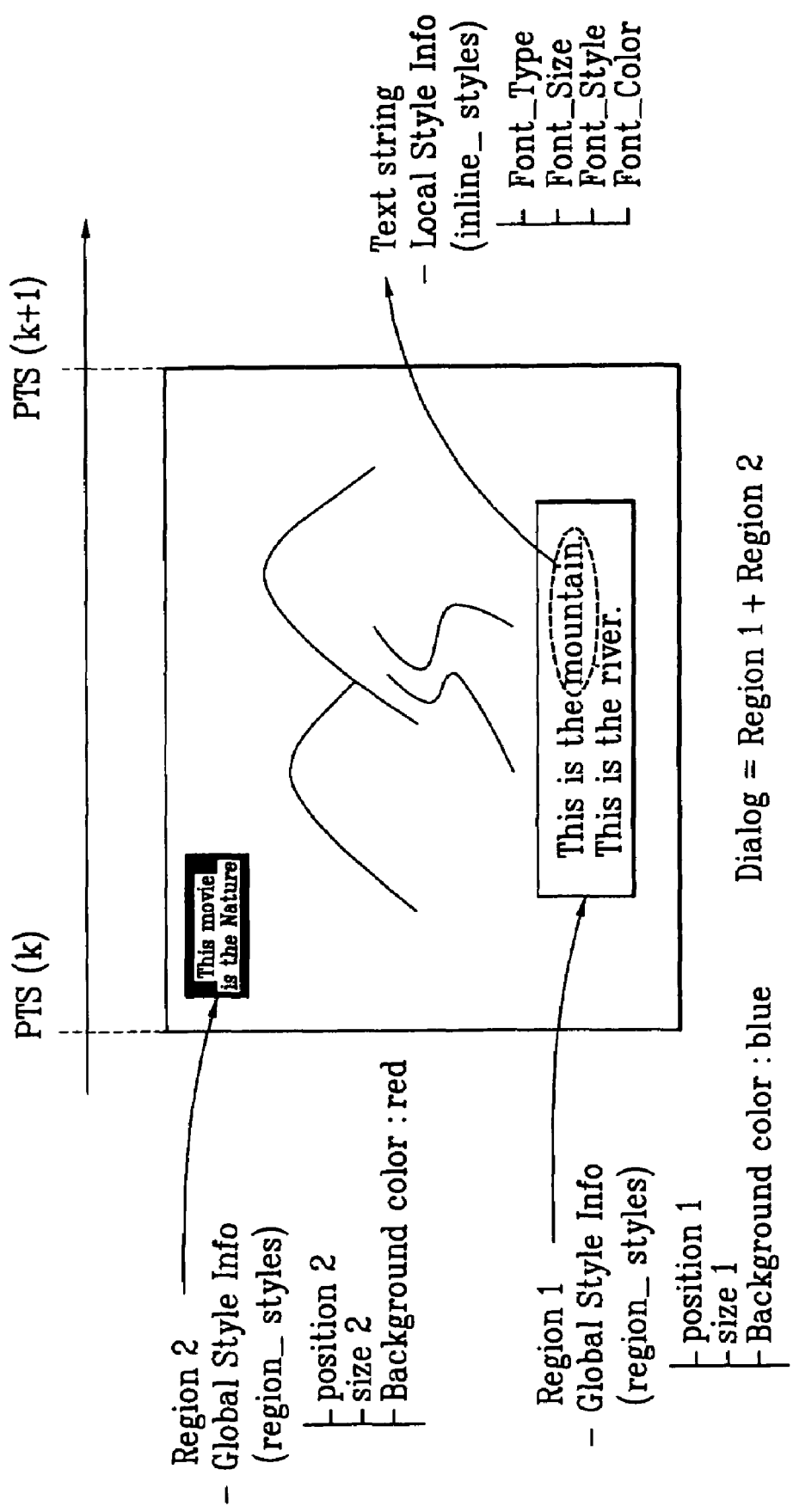

PES packet constraints

FIG. 8

```
Text_Subtitle_stream () {
      dialog_style_segment()
      while (processed_length < end_of_file){
            dialog_presentation_segment ()
      }
}
```

FIG. 9A

```
dialog_style_segment () {
      segment_type
      reserved
      segment_length
      dialog_styleset()
}
```

FIG. 9B

```
dialog_styleset () {
    player_style_flag
    reserved
    number_of_region_styles
    for (region_style_id=0;
    region_style_id<number_of_region_styles; region_style_id++) {
            region_style() {
                    region_info() {
                            region_horizontal_position
                            region_vertical_position
                            region_width
                            region_height
                            region_bg_color_index
                    }
                    text_horizontal_position
                    text_vertical_position
                    text_flow
                    text_alignment
                    line_space
                    font_id
                    font_style
                    font_size
                    font_color_index
            }
            user_changeable_styleset()
        }
    palette ()
    }
```

FIG. 9C

```
user_changeable_styleset () {
        number_of_user_styles
        for(user_style_id=0;
        user_style_id<number_of_user_styles;
        user_style_id++){
                User_control_style() {
                region_horizontal_position_direction
                region_horizontal_position_delta
                region_vertical_position_direction
                region_vertical_position_delta
                font_size_inc_dec
                font_size_delta
                }
        }
```

FIG. 9D

```
palette() {
    length
    while (processed_length < length) {
        palette_entry() {
            palette_entry_id
            Y_value
            Cr_value
            Cb_value
            T_value
```

FIG. 10A

```
dialog_presentation_segment () {
    segment_type
    reserved
    segment_length
    dialog_start_PTS
    dialog_end_PTS
    palette_update_flag
    reserved
    if (palette_update_flag==1b) {
        palette()
    }
    number_of_regions
    for (region_id=0; region_id<number_of_regions; region_id++) {
        dialog_region() {
            continuous_present_flag[region_id]
            region_style_id[region_id]
            region_subtitle()
            ~
        }
        ~
    }
    ~
}
```

FIG. 10B

```
region_subtitle () {
        region_subtitle_length
        while (processed_length < region_subtitle_length) {
                escape_code
                type
                if (type != 0x01) {
                        inline_style_length
                        inline_style_values() {
                                for (i=0; i<inline_style_length; i++) {
                                        inline_style_data_byte
                                }
                        }
                }
                if (type == 0x01) {
                        text_string_length
                        text_string() {
                                for (i=0; i<text_string_length; i++) {
                                        char_data_byte
                                }
                        }
                }
        }
}
```

RECORDING MEDIUM AND METHOD AND APPARATUS FOR REPRODUCING TEXT SUBTITLE STREAM INCLUDING PRESENTATION SEGMENTS ENCAPSULATED INTO PES PACKET

This application claims the benefit of the Korean Patent Application No. 10-2004-0018461, filed Mar. 18, 2004, which is hereby incorporated by reference as if fully set forth herein.

BACKGROUND OF THE INVENTION

1. Field of the Invention

The present invention relates to a recording medium, and more particularly, to a recording medium and method and apparatus for reproducing a text subtitle stream recorded on the recording medium. Although the present invention is suitable for a wide scope of applications, it is particularly suitable for recording the text subtitle stream file within the recording medium and effectively reproducing the recorded text subtitle stream.

2. Discussion of the Related Art

Optical discs are widely used as an optical recording medium for recording mass data. Presently, among a wide range of optical discs, a new high-density optical recording medium (hereinafter referred to as "HD-DVD"), such as a Blu-ray Disc (hereafter referred to as "BD"), is under development for writing and storing high definition video and audio data. Currently, global standard technical specifications of the Blu-ray Disc (BD), which is known to be the next generation technology, are under establishment as a next generation optical recording solution that is able to have a data significantly surpassing the conventional DVD, along with many other digital apparatuses.

Accordingly, optical reproducing apparatuses having the Blu-ray Disc (BD) standards applied thereto are also being developed. However, since the Blu-ray Disc (BD) standards are yet to be completed, there have been many difficulties in developing a complete optical reproducing apparatus. Particularly, in order to effectively reproduce the data from the Blu-ray Disc (BD), not only should the main AV data as well as various data required for a user's convenience, such as subtitle information as the supplementary data related to the main AV data, be provided, but also managing information for reproducing the main data and the subtitle data recorded in the optical disc should be systemized and provided.

However, in the present Blu-ray Disc (BD) standards, since preferred methods of creating the supplementary data, particularly the subtitle stream file, are yet to be completed, there are many restrictions in the full-scale development of a Blu-ray Disc (BD) basis optical reproducing apparatus. And, such restrictions cause problems in providing the supplementary data such as subtitles to the user.

SUMMARY OF THE INVENTION

Accordingly, the present invention is directed to a recording medium and method and apparatus for reproducing a text subtitle stream recorded on the recording medium that substantially obviate one or more problems due to limitations and disadvantages of the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a recording medium for reproducing text subtitle streams includes a data area storing at least one text subtitle stream, each text subtitle stream including a dialog style segment defining a group of region styles and a plurality of dialog presentation segments, each dialog presentation segment containing at least one region of dialog text and each region of dialog text being linked to a selected one of the group of region styles, wherein the dialog style segment and the plurality of dialog presentation segments are encapsulated in a plurality of PES packets, respectively.

In another aspect of the present invention, a method for reproducing a text subtitle stream recorded on a recording medium includes reading a dialog style segment included in the text subtitle stream, the dialog style segment defining a group of region styles, reading each one of a plurality of dialog presentation segments included in the text subtitle stream, each dialog presentation segment containing at least one region of dialog text and each region of dialog text being linked to a selected one of the group of region styles, the dialog style segment and the plurality of dialog presentation segments being encapsulated in a plurality of PES packets, respectively, and presenting each dialog presentation segment according to a continuous presentation flag contained in the each dialog presentation segment, the continuous presentation flag indicating whether continuous presentation is required for the each dialog presentation segment with previous one.

In a further aspect of the present invention, an apparatus for reproducing a text subtitle stream recorded on a recording medium includes a buffer configured to preload the text subtitle stream, the preloaded text subtitle stream including a dialog style segment defining a group of region styles and a plurality of dialog presentation segments, each dialog presentation segment containing at least one region of dialog text and each region of dialog text being linked to a selected one of the group of region styles, wherein the dialog style segment and the plurality of dialog presentation segments are encapsulated in a plurality of PES packets, respectively, and a text subtitle decoder configured to decode and present each dialog presentation segment according to a continuous presentation flag contained in the each dialog presentation segment, the continuous presentation flag indicating whether continuous presentation is required for the each dialog presentation segment with previous one.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIGS. 5A to 5C illustrate applications of the reproduction control information for reproducing the text subtitle stream according to the present invention;

FIG. 8 illustrates a syntax of the text subtitle stream file according to the present invention;

FIGS. 9A to 9D illustrate another example of syntax of the text subtitle stream file according to the present invention;

FIG. 10A illustrates another example of syntax of the text subtitle stream file according to the present invention;

FIG. 10B illustrates an example of a syntax of a region subtitle among the text subtitle stream file according to a first embodiment of the present invention.

DETAILED DESCRIPTION OF THE INVENTION

Figure 1:
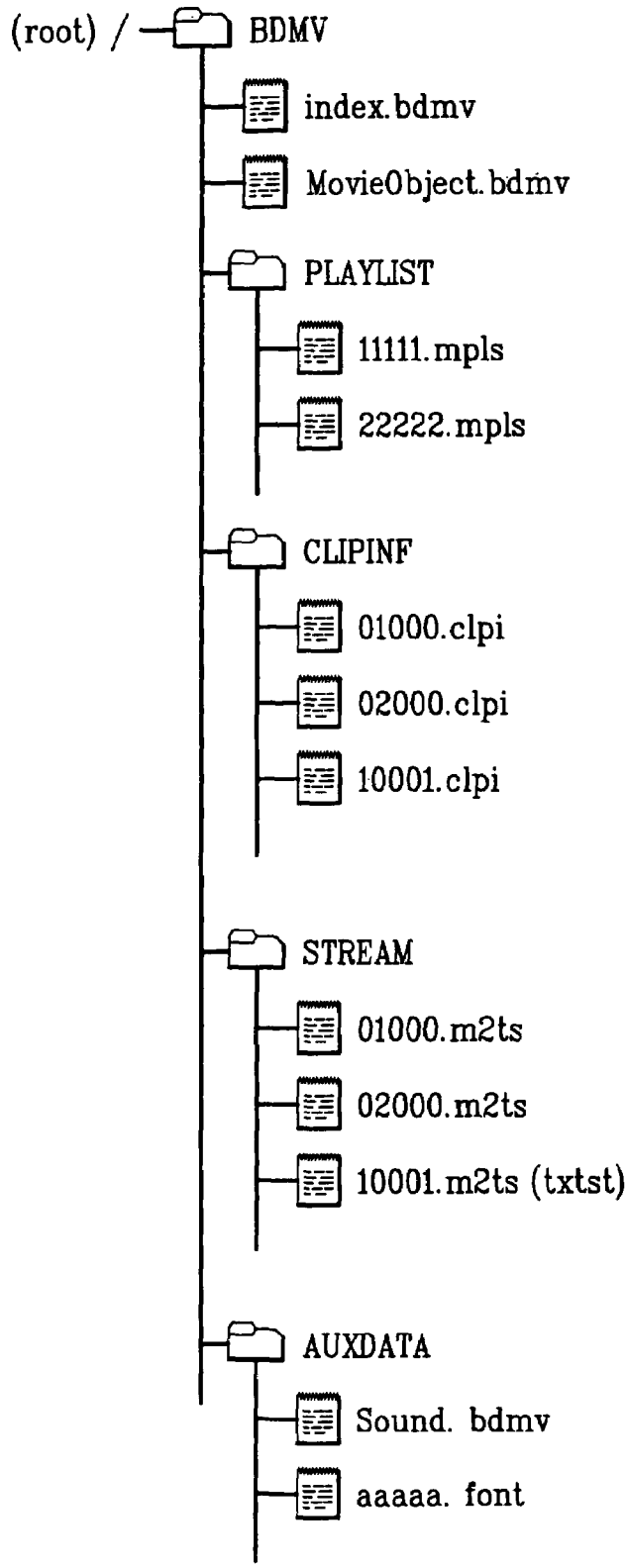
FIG. 1 illustrates a structure of the data files recorded in an optical disc according to the present invention.

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

In this detailed description, "recording medium" refers to all types of medium that can record data and broadly includes all types of medium regardless of the recording method, such as an optical disc, a magnetic tape, and so on. Hereinafter, for simplicity of the description of the present invention, the optical disc and, more specifically, the "Blu-ray disc (BD)" will be given as an example of the recording medium proposed herein. However, it will be apparent that the spirit or scope of the present invention may be equally applied to other types of recording medium.

In this detailed description, "main data"0 represent audio/video (AV) data that belong to a title (e.g., a movie title) recorded in an optical disc by an author. In general, the AV data are recorded in MPEG2 format and are often called AV streams or main AV streams. In addition, "supplementary data" represent all other data required for reproducing the main data, examples of which are text subtitle streams, interactive graphic streams, presentation graphic streams, and supplementary audio streams (e.g., for a browsable slide-show). These supplementary data streams may be recorded in MPEG2 format or in any other data format. They could be multiplexed with the AV streams or could exist as independent data files within the optical disc.

A "subtitle" represents caption information corresponding to video (image) data being reproduced, and it may be represented in a predetermined language. For example, when a user selects an option for viewing one of a plurality of subtitles represented in various languages while viewing images on a display screen, the caption information corresponding to the selected subtitle is displayed on a predetermined portion of the display screen. If the displayed caption information is text data (e.g., characters), the selected subtitle is often called a "text subtitle". Also, in the present invention, "palette information" refers to color information and opacity information, which are provided to the user, when the text subtitle data is reproduced onto the screen. According to the present invention, a plurality of text subtitle streams in MPEG2 format may be recorded in an optical disc, and they may exist as a plurality of independent stream files. Each "text subtitle stream file" is created and recorded within an optical disc. And, the purpose of the present invention is to provide a method and apparatus for reproducing the recorded text subtitle stream file.

FIG. 1 illustrates a file structure of the data files recorded in a Blu-ray disc (hereinafter referred to as "BD") according to the present invention. Referring to FIG. 1, at least one BD directory (BDMV) is included in a root directory (root). Each BD directory includes an index file (index.bdmv) and an object file (MovieObject.bdmv), which are used for interacting with one or more users. For example, the index file may contain data representing an index table having a plurality of selectable menus and movie titles. Each BD directory further includes four file directories that include audio/video (AV) data to be reproduced and various data required for reproduction of the AV data.

The file directories included in each BD directory are a stream directory (STREAM), a clip information directory (CLIPINF), a playlist directory (PLAYLIST), and an auxiliary data directory (AUX DATA). First of all, the stream directory (STREAM) includes audio/video (AV) stream files having a particular data format. For example, the AV stream files may be in the form of MPEG2 transport packets and be named as "*.m2ts", as shown in FIG. 1. The stream directory may further include one or more text subtitle stream files, where each text subtitle stream file includes text (e.g., characters) data for a text subtitle represented in a particular language and reproduction control information of the text data. The text subtitle stream files exist as independent stream files within the stream directory and may be named as "*.m2ts" or "*.txtst", as shown in FIG. 1. An AV stream file or text subtitle stream file included in the stream directory is often called a clip stream file.

Next, the clip information directory (CLIPINF) includes clip information files that correspond to the stream files (AV or text subtitle) included in the stream directory, respectively. Each clip information file contains property and reproduction timing information of a corresponding stream file. For example, a clip information file may include mapping information, in which presentation time stamps (PTS) and source packet numbers (SPN) are in a one-to-one correspondence and are mapped by an entry point map (EPM), depending upon the clip type. Using the mapping information, a particular location of a stream file may be determined from a set of timing information (In-Time and Out-Time) provided by a PlayItem or SubPlayItem, which will be discussed later in more details. In the industry standard, each pair of a stream file and its corresponding clip information file is designated as a clip. For example, 01000.clpi included in CLIPINF includes property and reproduction timing information of 01000.m2ts included in STREAM, and 01000.clpi and 01000.m2ts form a clip.

Referring back to FIG. 1, the playlist directory (PLAYLIST) includes one or more PlayList files (*.mpls), where each PlayList file includes at least one PlayItem that designates at least one main AV clip and the reproduction time of the main AV clip. More specifically, a PlayItem contains information designating In-Time and Out-Time, which represent reproduction begin and end times for a main AV clip designated by Clip_Information_File_Name within the PlayItem. Therefore, a PlayList file represents the basic reproduction control information for one or more main AV clips. In addition, the PlayList file may further include a SubPlayItem, which represents the basic reproduction control information for a text subtitle stream file. When a SubPlayItem is included in a PlayList file to reproduce one or more text subtitle stream files, the SubPlayItem is synchronized with the PlayItem(s). On the other hand, when the SubPlayItem is used to reproduce a browsable slideshow, it may not be synchronized with the PlayItem(s). According to the present invention, the main function of a SubPlayItem is to control reproduction of one or more text subtitle stream files.

Lastly, the auxiliary data directory (AUX DATA) may include supplementary data stream files, examples of which are font files (e.g., aaaaa.font or aaaaa.otf), pop-up menu files (not shown), and sound files (e.g., Sound.bdmv) for generating click sound. The text subtitle stream files mentioned earlier may be included in the auxiliary data directory instead of the stream directory.

Figure 2:
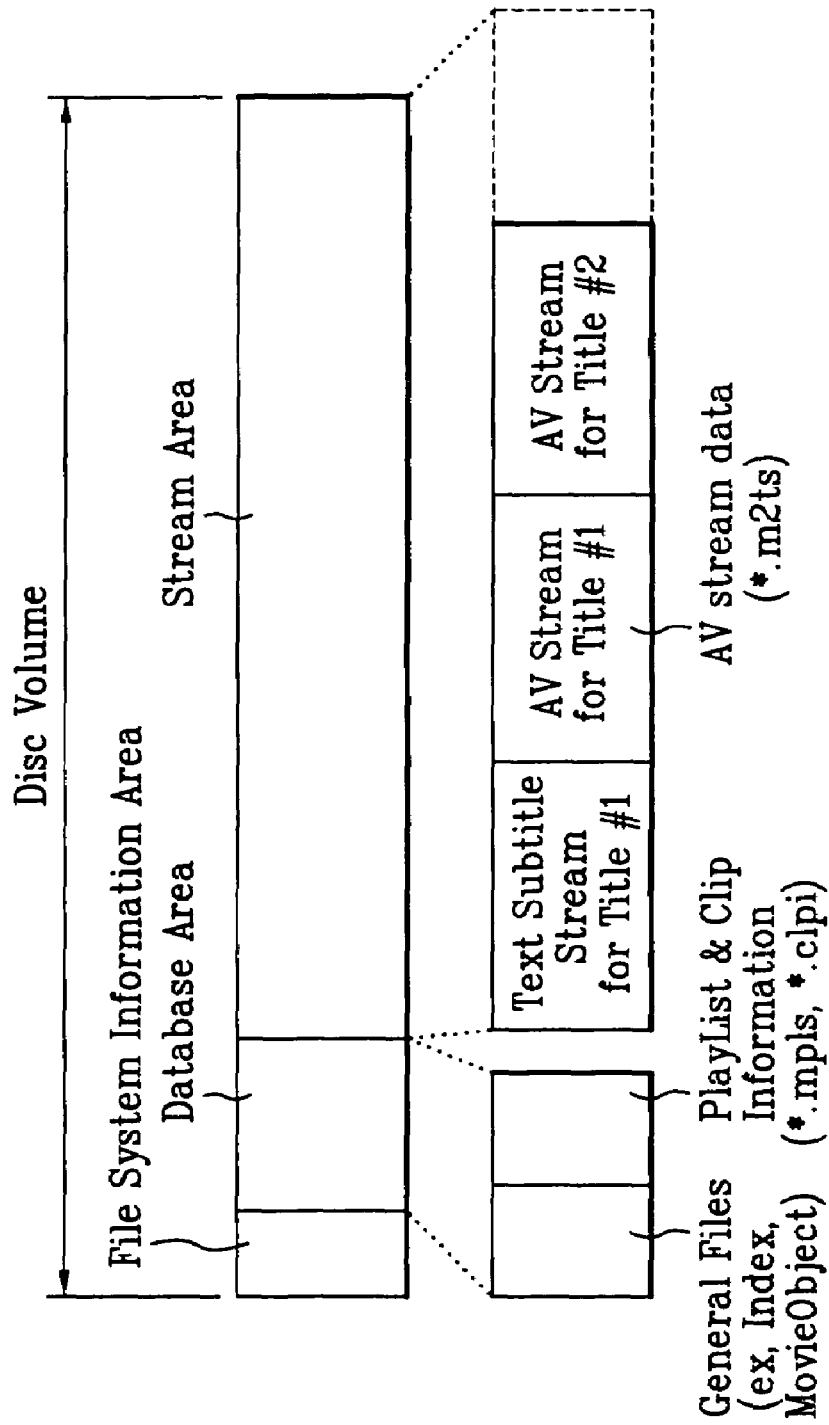
FIG. 2 illustrates data storage areas of the optical disc according to the present invention.

FIG. 2 illustrates data storage areas of an optical disc according to the present invention. Referring to FIG. 2, the optical disc includes a file system information area occupying the inmost portion of the disc volume, a stream area occupying the outmost portion of the disc volume, and a database area occupied between the file system information area and the stream area. In the file system information area, system information for managing the entire data files shown in FIG. 1 is stored. Next, main data and supplementary data (i.e., AV streams and one or more text subtitle streams) are stored in the stream area. The main data may include audio data, video data, and graphic data. And, the supplementary data (i.e., the text subtitle) is independently stored in the stream area without being multiplexed with the main data. The general files, PlayList files, and clip information files shown in FIG. 1 are stored in the database area of the disc volume. As discussed above, the general files include an index file and an object file, and the PlayList files and clip information files include information required to reproduce the AV streams and the text subtitle streams stored in the stream area. Using the information stored in the database area and/or stream area, a user is able to select a specific playback mode and to reproduce the main AV and text subtitle streams in the selected playback mode.

Figure 3:
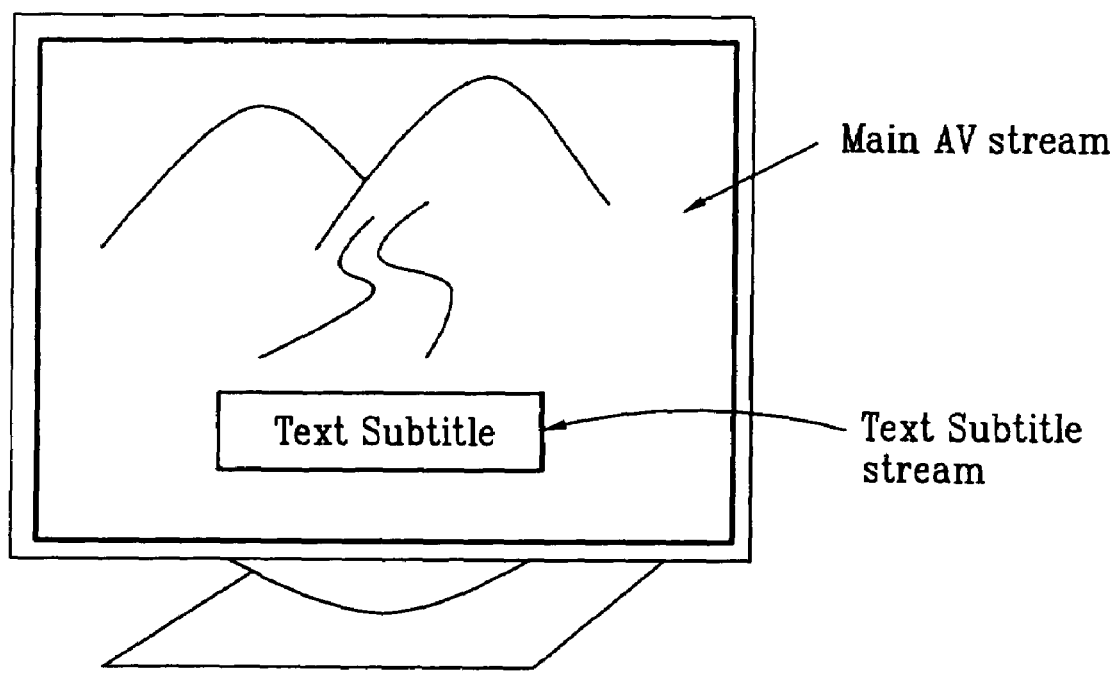
FIG. 3 illustrates a text subtitle and a main image presented on a display screen according to the present invention.

Hereinafter, the structure of the text subtitle stream file according to the present invention will be described in detail. First of all, the control information for reproducing the text subtitle stream will be newly defined. Then, the detailed description of the method of creating the text stream file including the newly defined control information, and the method and apparatus of reproducing the text subtitle stream for reproducing the recorded stream file will follow. FIG. 3 illustrates a text subtitle and a main image presented on a display screen according to the present invention. The main image and the text subtitle are simultaneously displayed on the display screen when a main AV stream and a corresponding text subtitle stream are reproduced in synchronization.

Figure 4:
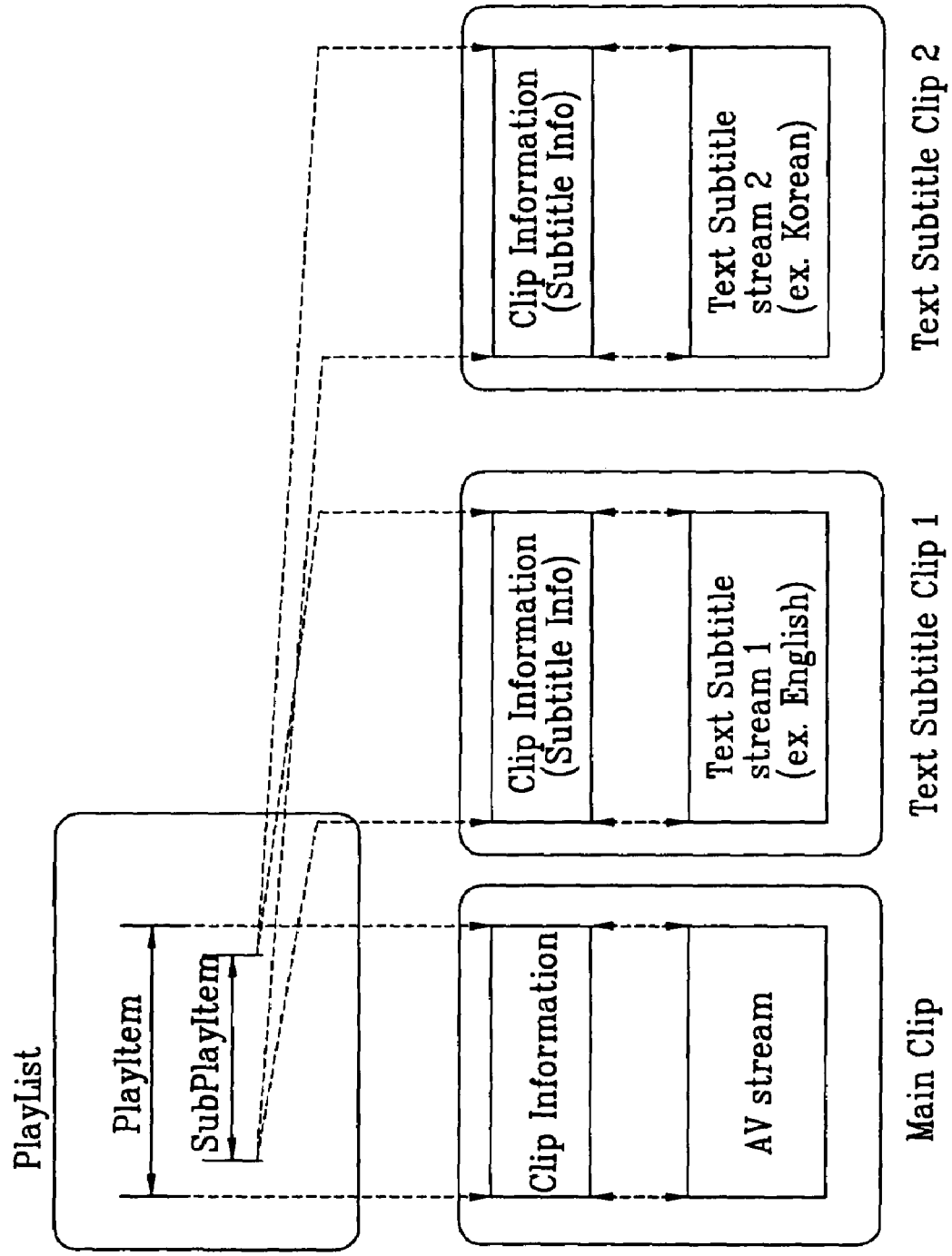
FIG. 4 illustrates a schematic diagram illustrating reproduction control of a text subtitle stream according to the present invention.

FIG. 4 is a schematic diagram illustrating reproduction control of a main AV clip and text subtitle clips according to the present invention. Referring to FIG. 4, a PlayList file includes at least one PlayItem controlling reproduction of at least one main AV clip and a SubPlayItem controlling reproduction of a plurality of text subtitle clips. One of text subtitle clip 1 and text subtitle clip 2, shown in FIG. 4, for English and Korean text subtitles may be synchronized with the main AV clip such that a main image and a corresponding text subtitle are displayed on a display screen simultaneously at a particular presentation time. In order to display the text subtitle on the display screen, display control information (e.g., position and size information) and presentation time information, examples of which are illustrated in FIG. 5A to FIG. 5C, are required.

Figure 5A:
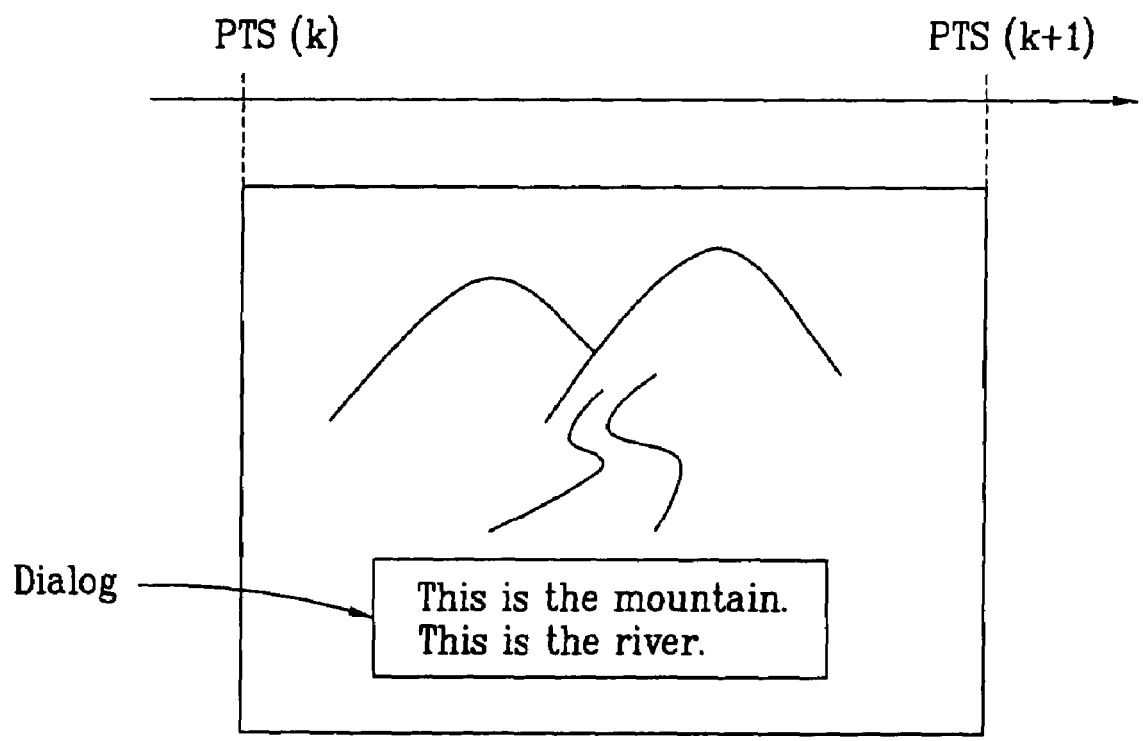

FIG. 5A illustrates a dialog presented on a display screen according to the present invention. A dialog represents entire text subtitle data displayed on a display screen during a given presentation time. In general, presentation times of the dialog may be represented in presentation time stamps (PTS). For example, presentation of the dialog shown in FIG. 5A starts at PTS (k) and ends at PTS (k+1). Therefore, the dialog shown in FIG. 5A represents an entire unit of text subtitle data which are displayed on the display screen between PTS (k) and PTS (k+1). A dialog includes a maximum of 100 character codes in one text subtitle.

Figure 5B:
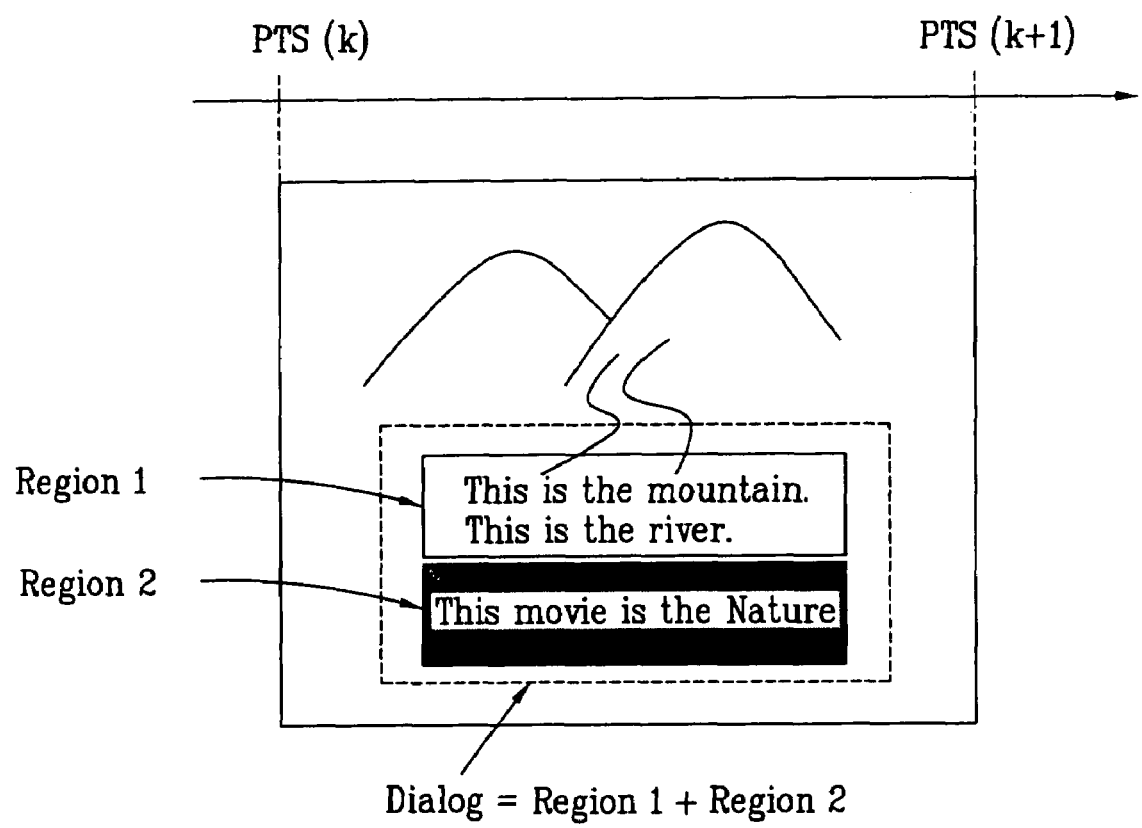

In addition, FIG. 5B illustrates regions of a dialog according to the present invention. A region represents a divided portion of text subtitle data (dialog) displayed on a display screen during a given presentation time. In other words, a dialog includes at least one region, and each region may include at least one line of subtitle text. The entire text subtitle data representing a region may be displayed on the display screen according to a region style (global style) assigned to the region. The maximum number of regions included in a dialog should be determined based on a desired decoding rate of the subtitle data because the greater number of regions generally results in a lower decoding ratio. For example, the maximum number of regions for a dialog may be limited to two in order to achieve a reasonably high decoding rate. Accordingly, the maximum number of regions within a single dialog is limited to 2 because of the decoding load, when the text subtitle stream is reproduced. In another embodiment of the present invention, a maximum of n number (wherein, n>2) of regions may exist within a single dialog.

FIG. 5C illustrates style information for regions of a dialog according to the present invention. Style information represents information defining properties required for displaying at least a portion of a region included in a dialog. Some of the examples of the style information are position, region size, background color, text alignment, text flow information, and many others. The style information may be classified into region style information (global style information) and inline style information (local style information).

Region style information defines a region style (global style) which is applied to an entire region of a dialog. For example, the region style information may contain at least one of a region position, region size, font color, background color, text flow, text alignment, line space, font name, font style, and font size of the region. For example, two different region styles are applied to region 1 and region 2, as shown in FIG. 5C. A region style with position 1, size 1, and color=blue is applied to Region 1, and a different region style with position 2, size 2, and color=red is applied to Region 2.

On the other hand, local style information defines an inline style (local style) which is applied to a particular portion of text strings included in a region. For example, the inline style information may contain at least one of a font type, font size, font style, and font color. The particular portion of text strings may be an entire text line within a region or a particular portion of the text line. Referring to FIG. 5C, a particular inline style is applied to the text portion "mountain" included in Region 1. In other words, at least one of the font type, font size, font style, and font color of the particular portion of text strings is different from the remaining portion of the text strings within Region 1. Accordingly, the above-described text data is recorded and described as a "text string" depending upon whether a specific inline style exists.

Figure 6A:
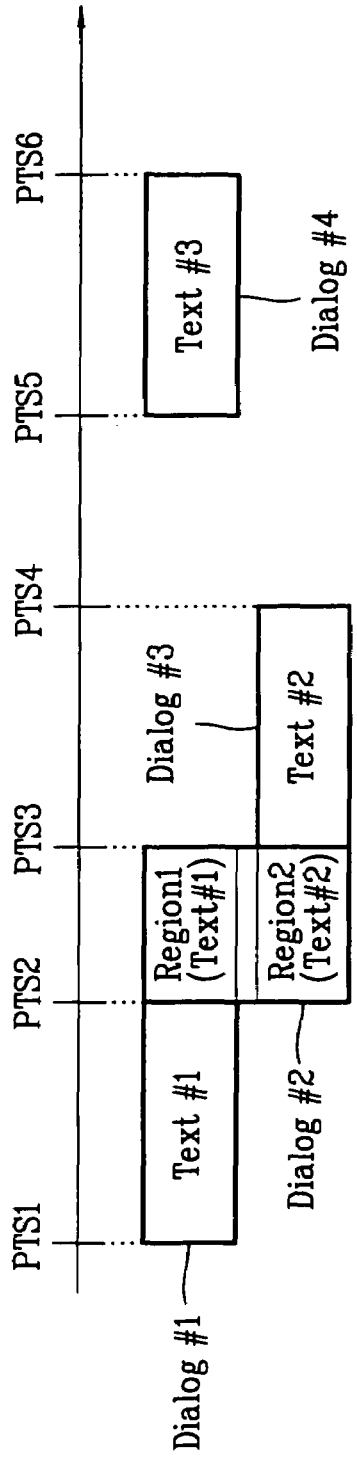
FIGS. 6A and 6B illustrate an example of the method for writing the reproduction control information within the text subtitle stream according to the present invention.
Figure 6B:
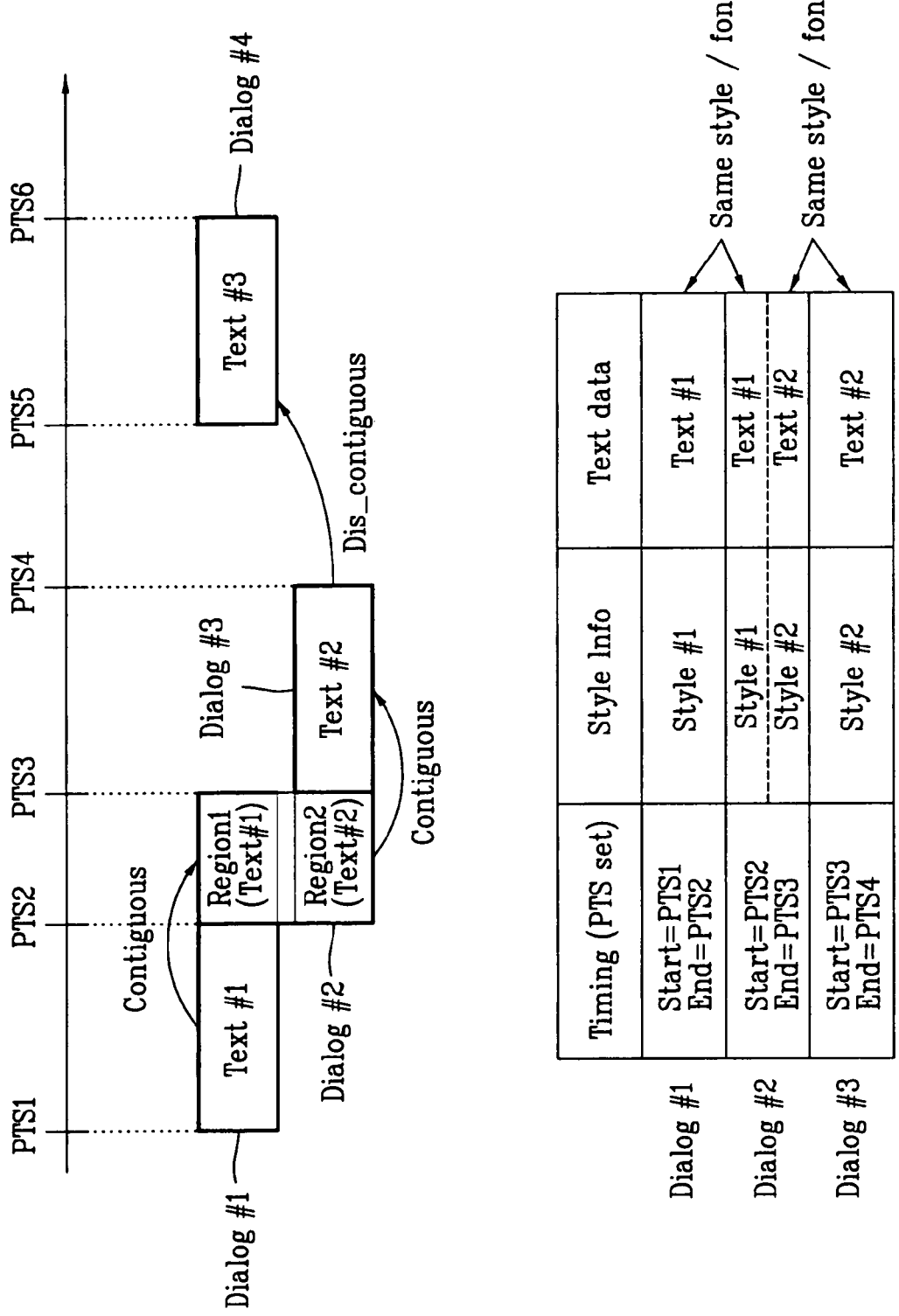

FIGS. 6A and 6B illustrate reproduction control information of the text subtitle stream and, more particularly, a method for providing the text subtitle stream by using the dialog information, the region information, and the style information. FIG. 6A illustrates a method for defining each dialog that is applied to each presentation time stamp (PTS) sections. Referring to FIG. 6A, four (4) dialogs exist between PTS1 to PTS6. Herein, Dialog #1 displays Text #1 in the section between PTS1 and PTS2 as the text data, and Dialog #2 has two (2) regions (region 1 and region 2) in the section between PTS2 and PTS3, wherein Text #1 is displayed in region 1 as the text data, and wherein Text #2 is displayed in region 2 as the text data. Also, Dialog #3 displays Text #2 in the section between PTS3 and PTS4 as the text data, and Dialog #4 displays Text #3 in the section between PTS5 and PTS6. Herein, the text subtitle data is not included in the section between PTS 4 and PTS5.

In describing the method for defining each dialog information, each dialog is required to include a timing information (PTS set), wherein the corresponding dialog is displayed, a style information, and an information related to the actual text data. Accordingly, the timing information (PTS set) that is displayed includes a PTS start information and a PTS end information, which are differentiated from one another. The style information includes a global style information and a local style information are defined, so as to be differentiated from one another, and in the present invention, the global and local style information are respectively recorded as a region style information (region_styles) and an inline style information (inline_styles). And, the Text Data is recorded as text data that is actually displayed. Most particularly, since Dialog #2 consists of region 1 and region 2, the style information and the text data are recorded for each of region 1 and region 2.

FIG. 6B illustrates a method for continuous reproduction between neighboring dialogs. For example, Dialog #1 and region 1 of Dialog #2 are continuously reproduced, and region 2 of Dialog #2 and Dialog #3 are continuously displayed. More specifically, in order to perform continuous reproduction between neighboring dialogs, the following conditions should be satisfied. First of all, the PTS should be continuous and should not be interrupted (e.g., the presentation end time of Dialog #1 and the presentation start time of Dialog #2 are identical, so as to enable the reproduction to be continuous). Thereafter, the style information of consecutive (or continuous) dialogs should also be identical. And so, since the PTS of Dialog #3 and the PTS of Dialog #4 are not consecutive (or continuous) dialogs, this section become discontinuous (or interrupted) and not continuous. Accordingly, by providing a continuous_present_flag, which indicates whether continuous reproduction is performed from the previous dialog, within the current (or present) dialog, thereby facilitating the performance of continuous reproduction. The above-described continuous present flag will be described in more detail with reference to FIG. 7C.

Figure 7A:
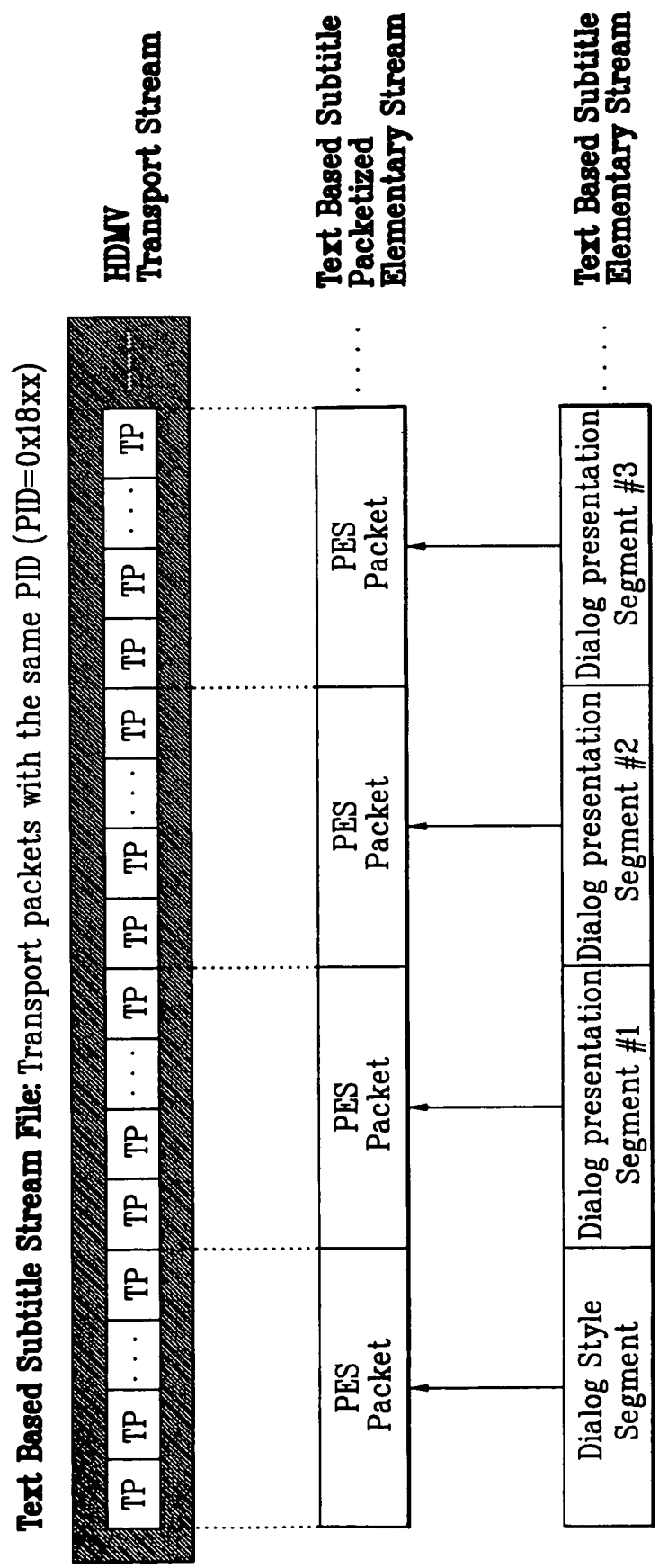
FIGS. 7A to 7C illustrate the structure of the text subtitle stream file and the reproduction control information included in the text subtitle stream file according to the present invention.

FIG. 7A illustrates a text subtitle stream file (e.g., 10001.m2ts shown in FIG. 1) according to the present invention. The text subtitle stream file may be formed of an MPEG2 transport stream including a plurality of transport packets (TP), all of which have a same packet identifier (e.g., PID=0x18xx). When a disc player receives many input streams including a particular text subtitle stream, it finds all the transport packets that belong to the text subtitle stream using their PIDs. Referring to FIG. 7A, each sub-set of transport packets form a packet elementary stream (PES) packet. One of the PES packets shown in FIG. 7A corresponds to a dialog style segment (DSS) defining a group of region styles. All the remaining PES packets after the second PES packet correspond to dialog presentation segments (DPSs)

In the above-described text subtitle stream structure of FIG. 7A, each of the dialog information shown in FIGS. 5A to 5C represent a dialog presentation segment (DPS). And, the style information included in the dialog information represents a set of information that links any one of the plurality of region style sets defined in the dialog style segment (DSS), which can also be referred to as "region_style_id", and inline styles. Accordingly, in the present invention, a region style set and palette information, which are applied to the dialog presentation segment (DPS), are recorded in the dialog style segment (DSS), which will now be described in detail.

Accordingly, in the present invention, a maximum number of region style information sets, wherein the maximum number is decided in accordance with the standard of the related technology, are recorded in the dialog style segment (DSS). For example, a maximum of 60 specific style information sets are recorded, each style information set being identified by a region_style_id. Therefore, in a text subtitle decoder (numeral 17 of FIG. 11), only one dialog presentation segment (DPS) at a time, so as to perform the decoding process. Meanwhile, the text subtitle stream according to the present invention is recorded in an MPEG-2 standard, and the packet elementary stream (PES) is also created in accordance with the MPEG-2 standard. Hereinafter, the structure of the packet elementary stream (PES), which forms the text subtitle stream, will now be described in detail with reference to FIG. 7C.

Figure 7B:
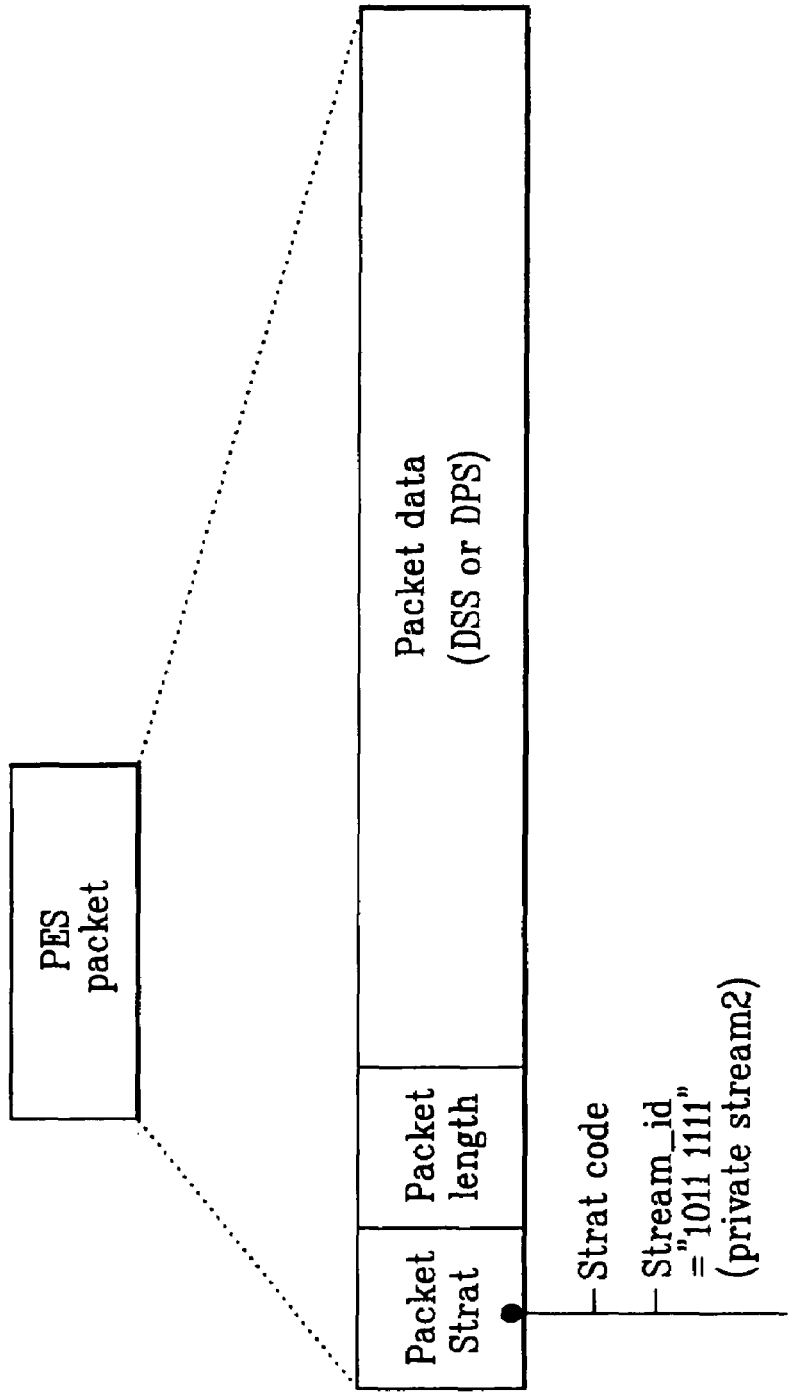

FIG. 7B illustrates a detailed structure of the packet elementary stream (PES), which forms the text subtitle stream according to the present invention and, most particularly, illustrates constraints when applying the PES to the text subtitle stream. More specifically, each packet stream (PES) according to the present invention is distinguished as a packet stream header (PES header) and packet data. Any one of the dialog style segment (DSS) and the dialog presentation segment (DPS) is recorded in the packet data. Also, diverse information may be recorded in the packet stream (PES) header in accordance with the MPEG-2 standard. However, some of the information may be recorded as limited (or constrained) values in accordance with the property of the text subtitle stream. More specifically, a "stream_id" field, which is a set of information deciding the packet stream type within the packet stream header (PES header), is set as "stream_id=1011 1111" so as to designate private stream 2. This is to preserve the text subtitle stream in a stream format that can be differentiated with the video stream or audio stream, yet to preserve the structure of the packet elementary stream (PES) to be similar to the video/audio stream.

In addition, any one of a dialog style segment (DSS) and a dialog presentation segment (DPS) is recorded in the packet data of a packet elementary stream (PES). For example, in the present invention, a dialog style segment (DSS) is recorded in a first packet elementary stream (PES). Then, a dialog presentation segment (DPS) that uses the dialog style segment (DSS) is recorded in the packet elementary stream (PES)

succeeding (or following) a second packet elementary stream (PES). Meanwhile, when the packet elementary stream (PES) is recorded with private stream 2, the presentation time stamp (PTS) and the decoding time stamp (DTS) are not recorded within the packet elementary stream header (PES header) as the timing information.

More specifically, the presentation time stamp (PTS) value is not recorded within the PES header so as to avoid duplicate recording of the dialog_start_PTS and the dialog_end_PTS within the dialog presentation segment (DPS), wherein the packet data is recorded. In addition, the decoding time stamp (DTS) value is not recorded within the PES header so that the decoding order of text subtitle stream is not changed (or modified), unlike general MPEG-2 video or audio streams. Another reason for not recording the DTS value within the PES header is because a separate DTS value is not required, since the entire text subtitle stream is stored in a preloading buffer and then sequentially decoded. With the exception of characteristic properties of the text subtitle stream, information is recorded within the PES header in accordance with the MPEG-2 standard.

Figure 7C:
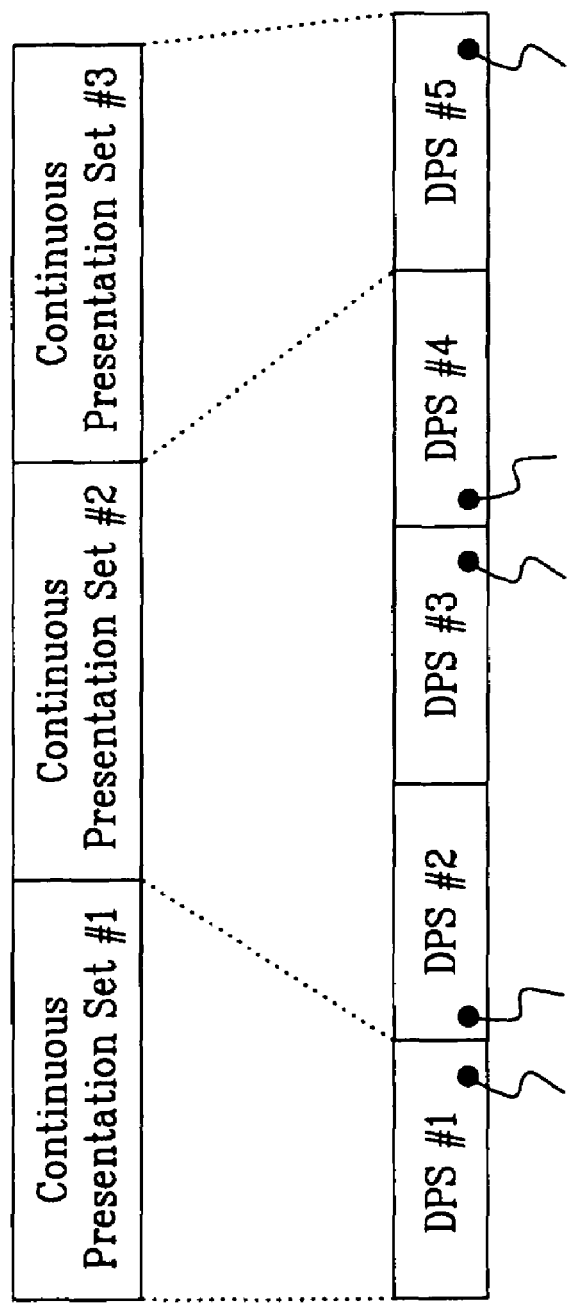

FIG. 7C illustrates a structure of the text subtitle stream file according to the present invention and, more particularly, illustrates a method for controlling the dialog presentation segment (DPS) as a single group. More specifically, the text subtitle stream file includes a continuous_present_flag, which indicate whether continuous presentation is performed between regions of neighboring dialog presentation segments (DPSs), as shown in FIG. 6A. Therefore, if the reproduction (or presentation) of the current DPS is continued from the previous DPS, "continuous_present_flag=1" is assigned, and if reproduction is not continued, "continuous_present_flag=0" is assigned. At this point, if at least one of the regions included in the DPS is set to be continuously reproduced, the corresponding DPS is defined as a "continuous presentation DPS". Thus, for example, DPS #2, DPS #3, and DPS #4, which are continuous presentation DPSs, are grouped as "continuous presentation set #2". And, when the above-described continuous presentation set #2 is reproduced (or presented), the first DPS of the continuous presentation set #2 (i.e., DPS #2) is first reproduced. Thereafter, without clearing the text data displayed onto the screen, the presentation is continued until the end of the presentation, which is until the end of the display of DPS #4.

The syntax structure of the above-described dialog style segment (DSS) and the dialog presentation segment (DPS), which are recorded in the packet data included in the packet elementary stream (PES) will now be described in detail with reference to FIGS. 8 to 10B. FIG. 8 illustrates a syntax of the text subtitle stream (Text_subtitle_stream( )) according to the present invention. Referring to FIG. 8, the Text_subtitle_stream( ) includes a dialog_style_segment( ) syntax and a dialog_presentation_segment( ) syntax, as shown in FIG. 7A. More specifically, the dialog_style_segment( ) syntax corresponds to a single dialog style segment (DSS) defining the style information set, and the dialog_presentation_segment( ) syntax corresponds to a plurality of dialog presentation segments (DPS) having the actual dialog information recorded therein.

FIGS. 9A to 9C illustrate a detailed structure of the dialog_style_segment( ), which represent the dialog style segment (DSS). More specifically, FIG. 9A illustrates the overall structure of the dialog_style_segment( ), wherein a dialog_style_set( ) defining diverse style information sets that are applied in the dialog is defined. FIG. 9B illustrates a dialog_style_set( ) according to the present invention, which is defined in the dialog_style_segment( ). Apart from the region_styles (region_style( )), the dialog_style_set( ) includes a Player_style_flag, a user_changeable_style set( ), and a palette( ), which indicates color information and degree of transparency. The Player_style_flag indicates whether change in style information by the player is authorized. Also, the user_changeable_style set( ) defines the range of change in style information by the player, and the palette( ) indicates color information.

The region style information (region_style( )) represents Global style information defined for each region, as described above. A region_style_id is assigned to each region, and a style information set corresponding to the specific region_style_id is defined. Therefore, when reproducing a dialog by recording the region_style_id, which is applied to the corresponding dialog, within the dialog presentation segment (DPS), style information set values defined by identical region_style_id within the dialog_style_set( ) are applied, so as to reproduce the dialog. Accordingly, individual style information included in the style information set provided to each region_style_id will now be described.

Herein, region_horizontal_position, region_vertical_position, region_width, and region_height are provided as information for defining the position and size of a corresponding region within the screen. And, region_bg_color_entry_id information deciding a background color of the corresponding region is also provided. In addition, as information defining an original (or starting) position of the text within the corresponding region, a text_horizontal_position and a text_vertical_position are provided. Also, a text_flow defining the direction of the text (e.g., left→right, right→left, up→down), and a text_alignment defining the alignment direction of the text (e.g., left, center, right) are provided. More specifically, when a plurality of regions are included in a specific dialog, the text_flow of each region included in the corresponding dialog is defined to have an identical text_flow value, so as to prevent users from viewing disturbed images.

Furthermore, a line_space designating space between each line within the region is provided as individual style information included in the style information set. And, a font_type, a font_style, a font_size, and a font_color_index are provided as font information for actual font information. Meanwhile, the Player_style_flag recorded within the dialog_style_set( ) indicates whether an author may apply the style information provided to the player. For example, when Player_style_flag=1b, as well as the style information defined in the dialog_style_set( ) recorded in a disc, the player is authorized to reproduce the text subtitle stream by applying the style information provided within the player itself. On the other hand, when Player_style_flag=0b, only usage of the style information defined in the dialog_style_set( ) recorded within the disc is authorized.

FIG. 9C illustrates the user_changeable_style set( ) according to the present invention, which is defined in dialog_style_set( ). The user_changeable_style set( ) pre-defines the types of style information that can be changed by the user and the range of change, and the user_changeable_style set( ) is used for easily changing the style information of the text subtitle data. However, when the user is enabled to change all style information, which are described in FIG. 9B, the user may more confused. Therefore, in the present invention, the style information of only the font_size, the region_horizontal_position, and the region_vertical_position may be changed. And, accordingly, variation in the text position and the line space, which may be changed in accordance with the font_size, is also defined in the user_changeable_style set( ). More specifically, the user_changeable_style set( ) is defined for each region_style_id. For example, a maximum of 25 user_style_id within a specific region_style_id=k may be defined in the user_changeable_style set( ).

Also, each user_style_id includes region_horizontal_position_direction and region_vertical_position_direction information, which designate the direction of the changed position of each of the changeable region_horizontal_position and region_vertical_position. Each user_style_id also includes region_horizontal_position_delta and region_vertical_position_delta information for designating a single position movement unit in each direction as a pixel unit. More specifically, for example, when region_horizontal_position_direction=0, the position of the region is moved to a right direction. And, when region_horizontal_position_direction=1, the position of the region is moved to a left direction. Also, when region_vertical_position_direction=0, the position of the region is moved to a downward direction. Finally, when region_vertical_position direction=1, the position of the region is moved to an upward direction.

Furthermore, each user_style_id includes font_size_inc_dec information, which designates the changing direction each of the changeable font_size, and font_size_delta information for designating a single position movement unit in each direction as a pixel unit. More specifically, for example, font_size_inc_dec=0 represents an increasing direction of the font_size, and font_size_inc_dec=1 represents a decreasing direction of the font_size. Moreover, the decrease or increase of the "text position" and the "line space", which are changed depending upon the decrease or increase of the font_size, may be defined by the same method as that of the font_size, the region_horizontal_position, and the region_vertical_position.

The characteristics of the user_changeable_style set( ) according to the present invention now be described in detail. The number of user_control_style( ) defined in each region_style( ) included in the dialog style segment (DSS) is identical. In other words, the number of user_control_styles that can be applied to each dialog presentation segment (DPS) is identical. In addition, each user_control_style( ) is represented by a different user_style_id. And, when the user selects a random user_style_id, the same order of user_control_style( ) is equally applied to each region_style( ). Furthermore, all possible combinations of the changeable styles are defined in a single user_control_style( ). In other words, the region_position and the font_size are simultaneously defined in combination, instead of being defined separately. And, finally, the moving direction (*_direction) or the increase/decrease indication (*_inc_dec) is independently distinguished from each position movement unit (*_delta) and recorded accordingly. More specifically, only the position movement unit (*_delta) is defined without having the style value, which is the value that is actually being changed. Subsequently, the defined position movement unit (*_delta) is added to the value defined in the region_style( ), thereby obtaining the final value of the style value that is actually being changed.

FIG. 9D illustrates palette information (palette( )) according to the present invention, which is defined in the dialog_style set( ). The palette( ) provides color changing information of the text subtitle data recorded within the dialog. Herein, the palette( ) includes a plurality of palette_entries, wherein each palette_entry is described by a palette_entry_id. And, each palette_entry is provided with a specific brightness value (Y_value), a specific color value (Cr_value, Cb_value), and a specific T_value, which designates the transparency of the text data, for each palette_entry_id. Accordingly, one of the characteristics of the text subtitle stream according to the present invention is that only one basic (or commnon) palette is defined, the palette being applied to each dialog presentation segment (DPS) included in the text subtitle stream file. More specifically, after defining a palette in the dialog style segment (DSS), the defined palette is commonly used in each dialog presentation segment (DPS). However, if a new specific palette is to be used instead of the common palette in a specific dialog presentation segment (DPS), the specific palette is newly defined by using the palette_update_flag, the description of which will follow with reference to FIG. 10A.

FIGS. 10A and 10B illustrate a detailed structure of the dialog_presentation_segment( ), which represent the dialog presentation segment (DPS) according to the present invention. FIG. 10A illustrates the overall structure of the dialog_presentation_segment( ), wherein a dialog_start_PTS and a dialog_end_PTS are defined. The dialog_start_PTS and the dialog_end_PTS designate the presentation time of the corresponding dialog. Then, the dialog_presentation_segment( ) includes a palette_update_flag, which indicates a change of color information within the corresponding dialog. Herein, when palette_update_flag=1b, the color and degree of transparency (T_value) are changed (or updated), and so the palette( ) information, which newly defines the color, is separately recorded. In this case, the palette( ) that is newly defined in the dialog presentation segment (DPS) must only be applied to the corresponding dialog presentation segment (DPS). Assuming that palette_update_flag=0b, when presenting (or reproducing) the corresponding dialog presentation segment (DPS), the above-described common palette, which has been defined in the dialog style segment (DSS), as shown in FIG. 9A, should be restored (or preserved).

Subsequently, a dialog_region( ) that defines the region information is recorded in the dialog_presentation_segment( ). In the present invention, a maximum of two regions is provided within a single dialog, and therefore, dialog_region( ) information is provided to each region. The dialog_region( ) includes region_style_id information and continuous_present_flag information. The region_style_id information designates any one of the region styles, as shown in FIG. 9B, and the continuous_present_flag information identifies whether to perform a seamless reproduction with the previous dialog region, as shown in FIG. 7B. Further, text data and region_subtitle( ) information are also included in the dialog_region( ). The text data is included in the actual corresponding region, and the region_subtitle( ) information defines the local style information.

FIG. 10B illustrates a region_subtitle( ) information defined within the dialog_region( ). Herein, the region_subtitle( ) is formed of a group (or pair) of a text string and an inline style information that is applied to the text string. In addition, when the type within the region_subtitle( ) is not equal to type=0x01, the region_subtitle( ) represents the inline style information. For example, type=0x02 represents a change in the Font set, and so a font ID value designated by the corresponding ClipInfo is recorded in a specific field (i.e., the inline_style_value( )), and type=0x03 represents a change in the Font style, and so a corresponding font style value is recorded in a specific field (i.e., the inline_style_value( )).

Also, type=0x04 represents a change in the Font size, and a corresponding font size value is recorded in a specific field (i.e., the inline_style_value( )), and type=0x05 represents a change in the Font color, and therefore, an index value designated by the corresponding palette is recorded in a specific field (i.e., the inline_style_value( )). Further, type=0x0A represents a line break. For example, the text portion "mountain" included in Region 1, as shown in FIG. 5C, is written as a text_string (e.g., text_string="mountain"), yet the text portion is set to "inline_style type=0x04 (change in Font size)" as the local style information. And, by setting inline_style_value=xxx, the Font_size of the corresponding text_string=mountain may be presented to a value (xxx), which is different from the value designated by the region_style( ).

Figure 11:
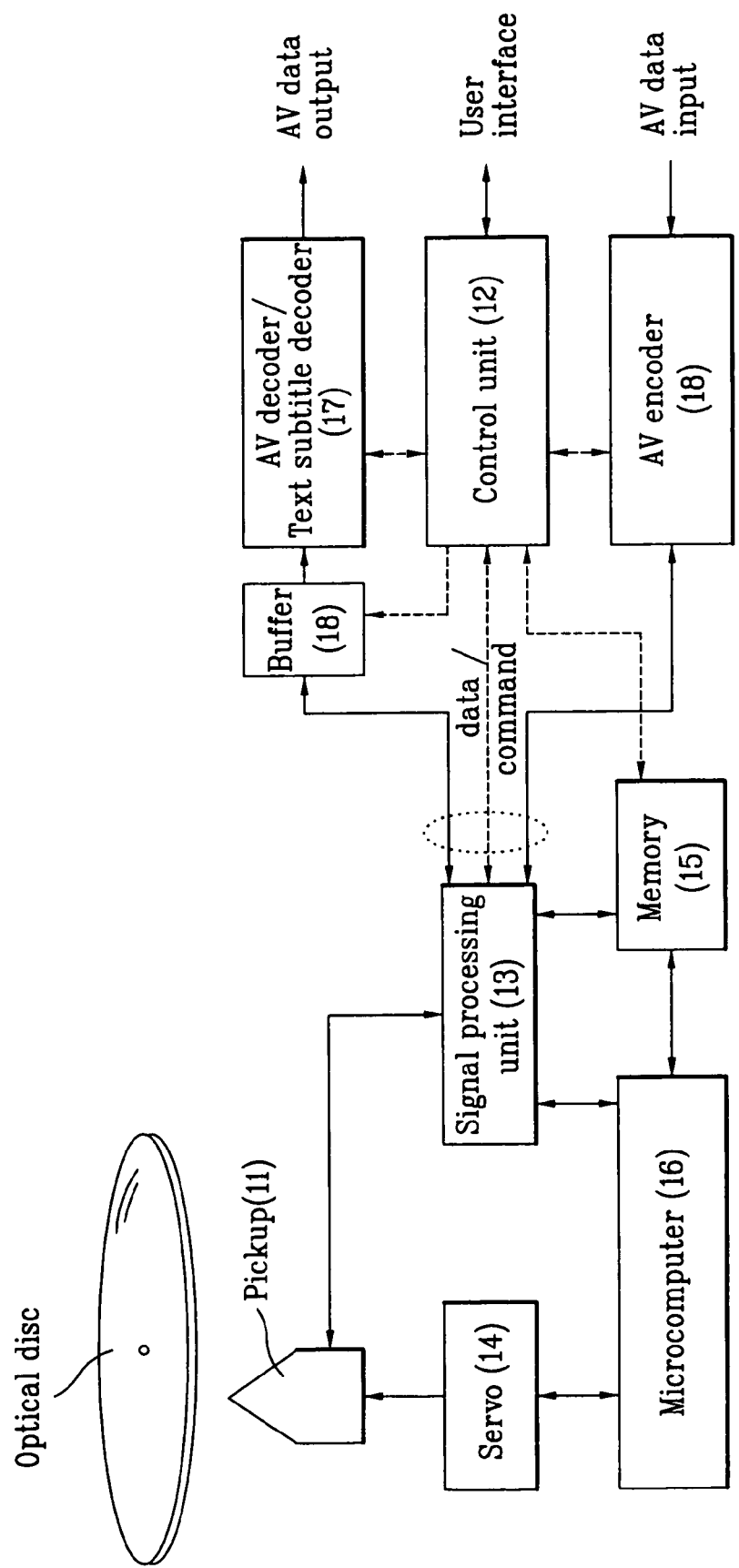
FIG. 11 illustrates an optical recording and/or reproducing apparatus including a reproduction of the text subtitle stream file according to the present invention.

FIG. 11 illustrates a detailed view of an optical recording and/or reproducing apparatus 10 according to the present invention, including the reproduction of the text subtitle data. The optical recording and/or reproducing apparatus 10 basically includes a pick-up unit 11 for reproducing main data, text subtitle stream and corresponding reproduction control information recorded on the optical disc, a servo 14 controlling the operations of the pick-up unit 11, a signal processor 13 either recovering the reproduction signal received from the pick-up unit 11 to a desired signal value, or modulating a signal to be recorded to an optical disc recordable signal and transmitting the modulated signal, and a microcomputer 16 controlling the above operations.

In addition, an AV decoder and text subtitle (Text ST) decoder 17 performs final decoding of output data depending upon the controls of the controller 12. And, in order to perform the function of recording a signal on the optical disc, an AV encoder 18 converts an input signal into a signal of a specific format (e.g., an MPEG-2 transport stream) depending upon the controls of the controller 12 and, then, provides the converted signal to the signal processor 13. Accordingly, the AV decoder and text subtitle (Text ST) decoder 17 is included in the present invention as a single decoder, for simplicity of the description. However, it is apparent that only the text subtitle (Text ST) decoder can be independently included as an element of the present invention.

A buffer 18 is used for preloading and storing the text subtitle stream in advance, in order to decode the text subtitle stream according to the present invention. The controller 12 controls the operations of the optical recording and/or reproducing apparatus. And, when the user inputs command requesting a text subtitle of a specific language to be displayed. Then, the corresponding text subtitle stream is preloaded and stored in the buffer 18. Subsequently, among the text subtitle stream data that is preloaded and stored in the buffer 18, the controller 12 refers to the above-described dialog information, region information, style information, and so on, and controls the text subtitle decoder 17 so that the actual text data are displayed with a specific size and at a specific position on the screen.

More specifically, in the method for reproducing the text subtitle stream according to the present invention, a dialog style segment (DSS) recorded in the first packet elementary stream (PES) within the text subtitle stream is read. Then, a specific style is applied to each dialog presentation segment (DPS) recorded in the packet elementary stream (PES) succeeding (or following) the second PES for reproduction. However, the reproduction is performed by deciding the application of the previous DPS in accordance with the continuous_presentation_flag recorded in the current dialog presentation segment (DPS), which the user wishes to reproduce. In other words, when the continuous presentation information recorded within the current dialog presentation segment (DPS), which is to be reproduced (or presented), is set to be continuous_presentation_flag=0b, the current dialog presentation segment (DPS) is presented independently from the previous dialog presentation segment (DPS). On the other hand, when the continuous presentation information recorded within the current dialog presentation segment (DPS), which is to be reproduced (or presented), is set to be continuous_presentation_flag=1b, the current dialog presentation segment is reproduced (or presented) by using the decoded result from the previous dialog presentation segment.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A recording medium storing a data structure for managing reproduction of text by a reproducing apparatus, the data structure comprising:

an information area storing at least one text subtitle stream, character data for a text subtitle represented in a particular language, the text subtitle stream including a style segment defining a group of region styles and at least one presentation segment, the presentation segment containing at least one region of text and the region of text being linked to one of the group of region styles defined in the style segment by an identifier, wherein the style segment and the presentation segment are encapsulated into a respective PES packet, the PES packet including packet data and stream identification information indicating a type of the PES packet, the stream identification information being included in a header of the PES packet, and wherein the presentation segment contains a continuous presentation flag indicating whether continuous presentation is required for the presentation segment with respect to a previous presentation segment, a presentation start time of the presentation segment is equal to a presentation end time of the previous presentation segment if the continuous presentation flag indicates that the presentation segment is continuously reproduced from the previous presentation segment.

2. The medium of claim 1, wherein the PES packet encapsulating the style segment is in the forefront within the text subtitle stream.

3. The medium of claim 1, wherein the PES packet comprises at least one transport packet.

4. The medium of claim 3, wherein all of the transport packets included in the plurality of PES packets have a same packet Identification (PID) value.

5. The medium of claim 1, wherein the PES packet is private stream 2 PES packet preserving the text subtitle.

6. The medium of claim 1, wherein the PES packet comprises stream identification, PES packet length, and packet data.

7. The medium of claim 6, wherein the stream identification (ID) indicates a type of the PES packet.

8. The medium of claim 6, wherein the PES identification and packet length included in the PES packet contains no presentation and decoding time information.

9. The medium of claim 1, wherein the plurality of presentation segments comprises at least one continuous presentation set, each of which comprises one or more presentation segments that require continuous presentation.

10. The medium of claim 1, wherein the style segment defines palette information configured to be commonly applied to the plurality of presentation segments.

11. The medium of claim 10, wherein one of the plurality of presentation segments includes a palette update flag and defines new palette information, the palette update flag indicating that the new palette information is configured to be applied to the dialog presentation segment.

12. The medium of claim 11, wherein the new palette information is configured to be applied to the presentation segment only.

13. The medium of claim 1, wherein the text subtitle stream is carried in a sequence of PES packets.

14. The medium of claim 6, the stream identification of the private stream 2 designates text subtitle stream.

15. The medium of claim 6, wherein the stream identification of the text subtitle stream is $1011\ 1111_b$.

16. The medium of claim 6, wherein the packet length indicates a value specifying the length of the PES packet.

17. The medium of claim 6, wherein the packet data comprises data as any one form of a style segment or a presentation segment.

18. A method for reproducing a text subtitle stream, character data for a text subtitle represented in a particular language, recorded on a recording medium, the method comprising:
  reading, at a reproducing apparatus, a style segment included in the text subtitle stream from the recording medium, the style segment defining a group of region styles;
  reading, at a reproducing apparatus, the presentation segment included in the text subtitle stream from the recording medium, the presentation segment containing at least one region of text and the region of text being linked to one of the group of region styles defined in the style segment by an identifier, the style segment and the presentation segment being encapsulated into a respective PES packet, the PES packet including packet data and stream identification information indicating a type of the PES packet, the stream identification information being included in a header of the PES packet; and
  reproducing, at a reproducing apparatus, the presentation segment recorded on the recording medium according to a continuous presentation flag contained in the presentation segment, the continuous presentation flag indicating whether continuous presentation is required for the the presentation segment with respect to a previous presentation segment, a presentation start time of the presentation segment is equal to a presentation end time of the previous presentation segment if the continuous presentation flag indicates that the presentation segment is continuously reproduced from the previous presentation segment.

19. The method of claim 18, wherein the presentation segment contains information indicating presentation start and end times of the presentation segment.

20. The method of claim 18, further comprising preloading the text subtitle stream into a buffer.

21. An apparatus for reproducing a text subtitle stream recorded on a recording medium, the apparatus comprising:
  a buffer configured to preload the text subtitle stream, character data for a text subtitle represented in a particular language, the text subtitle stream including a style segment defining a group of region styles and at least one presentation segment, the presentation segment containing at least one region of text and the region of text being linked to one of the group of region styles defined in the style segment by an identifier, wherein the style segment and the presentation segment are encapsulated into a respective PES packet, the PES packet including packet data and stream identification information indicating a type of the PES packet, the stream identification information being included in a header of the PES packet; and
  a text subtitle decoder configured to decode and present the presentation segment according to a continuous presentation flag contained in the presentation segment, the continuous presentation flag indicating whether continuous presentation is required for the presentation segment with respect to a previous presentation segment, a presentation start time of the presentation segment is equal to a presentation end time of the previous presentation segment if the continuous presentation flag indicates that the presentation segment is continuously reproduced from the previous presentation segment.

22. The apparatus of claim 21, wherein the buffer is configured to preload the text subtitle stream including style segment encapsulated into the PES packet which is in the forefront within the text subtitle stream.

23. The apparatus of claim 21, wherein the buffer is configured to preload the text subtitle stream including style segment encapsulated into the PES packet which comprises at least one transport packet.

24. The apparatus of claim 23, wherein the buffer is configured to preload the text subtitle stream including style segment encapsulated into the PES packet including transport packets which have a same packet identification (PID) value.

25. The apparatus of claim 21, wherein the buffer is configured to preload the text subtitle stream including style segment encapsulated into the PES packet which comprises stream identification, PES packet length, and packet data.

26. The apparatus of claim 25, wherein the buffer is configured to preload the text subtitle stream including style segment encapsulated into the PES packet which comprises stream identification which indicates a type of the PES packet.

27. A method for generating a text subtitle stream, the method comprising:
  generating, at a controller configured to generate, at least one text subtitle stream from a recording medium, character data for a text subtitle represented in a particular language, the text subtitle stream including a style segment defining a group of region styles and at least one presentation segment, the presentation segment containing at least one region of text and the region of text being linked to one of the group of region styles defined in the style segment by an identifier, wherein the style segment and the presentation segment are encapsulated into a respective PES packet, the PES packet including packet data and stream identification information indicating a type of the PES packet, the stream identification information being included in a header of the PES packet, wherein
  the presentation segment contains a continuous presentation flag indicating whether continuous presentation is required for the presentation segment with respect to a previous presentation segment, a presentation start time of the presentation segment is equal to a presentation end time of the previous presentation segment if the continuous presentation flag indicates that the presentation segment is continuously reproduced from the previous presentation segment.

28. The method of claim 27, wherein the PES packet encapsulating the style segment is in the forefront within the text subtitle stream.

29. The method of claim 27, wherein the PES packet comprises at least one transport packet.

30. The method of claim 27, wherein all of the transport packets included in the plurality of PES packets have a same packet identification (PID) value.

31. The method of claim 30, wherein the PES packet is private stream 2 PES packet preserving the text subtitle stream in a stream format that is differentiated with a video or an audio data.

32. A method for recording a text subtitle stream, the method comprising:

generating, at a controller configured to generate, the text subtitle stream, character data for a text subtitle represented in a particular language, the text subtitle stream including a style segment defining a group of region styles and at least one presentation segment, the presentation segment containing at least one region of text and the region of text being linked to one of the group of region styles defined in the style segment by an identifier, wherein the style segment and the presentation segment are encapsulated into a respective PES packet, the PES packet including packet data and stream identification information indicating a type of the PES packet, the stream identification information being included in a header of the PES packet, wherein the presentation segment contains a continuous presentation flag indicating whether continuous presentation is required for the presentation segment with respect to a previous presentation segment, a presentation start time of the presentation segment is equal to a presentation end time of the previous presentation segment if the continuous presentation flag indicates that the presentation segment is continuously reproduced from the previous presentation segment; and storing the subtitle stream on a storing device.

33. The method of claim 32, wherein the PES packet encapsulating the style segment is in the forefront within the text subtitle stream.

34. The method of claim 32, wherein the PES packet comprises at least one transport packet.

35. The method of claim 34, wherein all of the transport packets included in the plurality of PES packets have a same packet identification (PID) value.

36. The method of claim 32, wherein the PES packet is private stream 2 PES packet preserving the text subtitle stream in a stream format that is differentiated with a video or an audio format.

37. An apparatus for generating a text subtitle stream, the apparatus comprising:

a controller configured to generate at least one text subtitle stream, character data for a text subtitle represented in a particular language, the text subtitle stream including a style segment defining a group of region styles and at least one presentation segment, the presentation segment containing at least one region of text and the region of text being linked to one of the group of region styles defined in the style segment by an identifier, wherein the style segment and the presentation segment are encapsulated into a respective PES packet, the PES packet including packet data and stream identification information indicating a type of the PES packet, the stream identification information being included in a header of the PES packet, wherein the presentation segment contains a continuous presentation flag indicating whether continuous presentation is required for the presentation segment with respect to a previous presentation segment, a presentation start time of the presentation segment is equal to a presentation end time of the previous presentation segment if the continuous presentation flag indicates that the presentation segment is continuously reproduced from the previous presentation segment.

38. The apparatus of claim 37, wherein the controller is configured to generate the text subtitle stream including style segment encapsulated into the PES packet which is in the forefront within the text subtitle stream.

39. The apparatus of claim 37, wherein the controller is configured to generate the text subtitle stream including style segment encapsulated into the PES packet which comprises at least one transport packet.

40. The apparatus of claim 39, wherein the controller is configured to generate the text subtitle stream including style segment encapsulated into the PES packet including transport packets which have a same packet identification (PID) value.

41. The apparatus of claim 37, wherein the controller is configured to generate the text subtitle stream including style segment encapsulated into the PES packet which comprises stream identification, PES packet length, and packet data.

42. The apparatus of claim 41, wherein the controller is configured to generate the text subtitle stream including style segment encapsulated into the PES packet comprising stream identification which indicates a type of the PES packet.

43. The apparatus of claim 37, wherein the controller is configured to control the pickup to record the text subtitle stream including style segment encapsulated into the PES packet which is in the forefront within the text subtitle stream.

44. The apparatus of claim 37, wherein the controller is configured to control the pickup to record the text subtitle stream including style segment encapsulated into the PES packet which comprises at least one transport packet.

45. The apparatus of claim 39, wherein the controller is configured to control the pickup to record the text subtitle stream including style segment encapsulated into the PES packet including transport packets which have a same packet identification (PES) value.

46. The apparatus of claim 37, wherein the controller is configured to control the pickup to record the text subtitle stream including style segment encapsulated into the PES packet which comprises stream identification, PES packet length, and packet data.

47. The apparatus of claim 41, the controller is configured to control the pickup to record the text subtitle stream including style segment encapsulated into the PES packet comprising stream identification which indicates a type of the PES packet.

48. An apparatus for recording a text subtitle stream, the apparatus comprising:

a pickup configured to record data; and a controller configured to control the pickup to record at least one text subtitle stream, character data for a text subtitle represented in a particular language, the text subtitle stream including a style segment defining a group of region styles and at least one presentation segment, the presentation segment containing at least one region of text and the region of text being linked to one of the group of region styles defined in the style segment by an identifier, wherein the style segment and the presentation segment are encapsulated into a respective PES packet, the PES packet including packet data and stream identification information indicating a type of the PES packet, the stream identification information being included in a header of the PES packet, wherein the presentation segment contains a continuous presentation flag indicating whether continuous presentation is required for the the presentation segment with respect to a previous presentation segment, a presentation start time of the presentation segment is equal to a presentation end time of the previous presentation segment if the continuous presentation flag indicates that the presentation segment is continuously reproduced from the previous presentation segment.

* * * * *